US009241094B2

(12) United States Patent
Adiletta et al.

(10) Patent No.: US 9,241,094 B2
(45) Date of Patent: Jan. 19, 2016

(54) CAPTURING EVENT INFORMATION USING A DIGITAL VIDEO CAMERA

(75) Inventors: Matthew Adiletta, Bolton, MA (US); Chengda Yang, Auburndale, MA (US)

(73) Assignee: Intel Corporation, Santa Clara, CA (US)

( * ) Notice: Subject to any disclaimer, the term of this patent is extended or adjusted under 35 U.S.C. 154(b) by 1510 days.

(21) Appl. No.: 12/050,811

(22) Filed: Mar. 18, 2008

(65) Prior Publication Data

US 2009/0238542 A1 Sep. 24, 2009

(51) Int. Cl.
| | |
|---|---|
| *H04N 5/782* | (2006.01) |
| *H04N 5/14* | (2006.01) |
| *G08B 13/196* | (2006.01) |
| *H04N 5/77* | (2006.01) |
| *H04N 7/18* | (2006.01) |

(52) U.S. Cl.
CPC .......... *H04N 5/145* (2013.01); *G08B 13/19606* (2013.01); *G08B 13/19663* (2013.01); *G08B 13/19682* (2013.01); *H04N 5/77* (2013.01); *H04N 5/782* (2013.01); *H04N 7/181* (2013.01); *H04N 7/188* (2013.01)

(58) Field of Classification Search
CPC ................... G08B 13/19606; G08B 13/19663; G08B 13/19682; H04N 7/188; H04N 5/77; H04N 5/782; H04N 7/181; H04N 5/145; H04N 5/00
USPC ........................................................ 348/143
See application file for complete search history.

(56) References Cited

U.S. PATENT DOCUMENTS

| | | | |
|---|---|---|---|
| 5,731,832 A | | 3/1998 | Ng |
| 5,831,669 A | | 11/1998 | Adrain |
| 5,838,365 A | * | 11/1998 | Sawasaki et al. ............. 348/169 |
| 6,256,046 B1 | * | 7/2001 | Waters et al. ................. 345/473 |
| 6,400,265 B1 | | 6/2002 | Saylor et al. |
| 6,584,228 B1 | * | 6/2003 | Wu ............................... 382/240 |
| 6,661,470 B1 | * | 12/2003 | Kawakami ........... G09G 3/2022 345/474 |

(Continued)

FOREIGN PATENT DOCUMENTS

| | | |
|---|---|---|
| CN | 101094306 A | 12/2007 |
| WO | WO-2009/117339 A2 | 9/2009 |

OTHER PUBLICATIONS

International Preliminary Report on Patentability for International Patent Application No. PCT/US2009/037233 mailed Sep. 30, 2010, 5 pages.

(Continued)

*Primary Examiner* — Ebrahim Golabbakhsh
(74) *Attorney, Agent, or Firm* — International IP Law Group, P.L.L.C.

(57) ABSTRACT

An event aware video system (EAVS) is to capture video frames during a first time period and process event portion of the video frames before transferring the processed data to a central computing system. The EAVS may establish a present no-event frame from the video frames, wherein a last frame of the video frames is marked as the present no-event frame if the difference between adjacent pair of frames of the video frames is less than a threshold value. The EAVS may establish an event frame, wherein a present frame captured after establishing the no-event frame is marked as the event frame if the difference between the present frame and a previous frame captured prior to the present frame is greater than the threshold value. The EAVS may generate the processed data by processing the event of the event frame.

21 Claims, 5 Drawing Sheets

(56) References Cited

U.S. PATENT DOCUMENTS

| | | | |
|---|---|---|---|
| 6,757,330 B1* | 6/2004 | Hsu | 375/240.17 |
| 2003/0044083 A1 | 3/2003 | Mekata | |
| 2003/0086496 A1* | 5/2003 | Zhang | G06K 9/00711 |
| | | | 375/240.16 |
| 2003/0086498 A1 | 5/2003 | Lee et al. | |
| 2004/0212678 A1 | 10/2004 | Cooper et al. | |
| 2005/0036659 A1 | 2/2005 | Talmon et al. | |
| 2006/0222077 A1* | 10/2006 | Ohwaki et al. | 382/240 |
| 2007/0071344 A1 | 3/2007 | Ouzilevski et al. | |
| 2007/0132836 A1 | 6/2007 | Katz | |
| 2007/0297668 A1* | 12/2007 | Matsuzaki | 382/163 |
| 2008/0239143 A1* | 10/2008 | Shin et al. | 348/416.1 |
| 2010/0103151 A1* | 4/2010 | Harada | 345/207 |
| 2011/0058611 A1* | 3/2011 | Sugimoto et al. | 375/240.16 |

OTHER PUBLICATIONS

Seong Woo Kim, International Search Report, Patent Cooperation Treaty, Nov. 2, 2009, 3 pages, PCT/US2009/037233, Korean Intellectual Property Office, Daejeon, Republic of Korea.

Office Action received for Chinese Patent Application No. 200980110616.1, mailed on Mar. 21, 2012, 18 pages including 11 pages of English Translation.

* cited by examiner

CAPTURING EVENT INFORMATION USING A DIGITAL VIDEO CAMERA

BACKGROUND

Video surveillance systems generally comprise a plurality of video cameras and each video camera may capture the image of a specific area within the view of the video camera. The video cameras may capture the data and compress the video data before sending the compressed data to a central computing system.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a technique for capturing event information using a digital camera. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
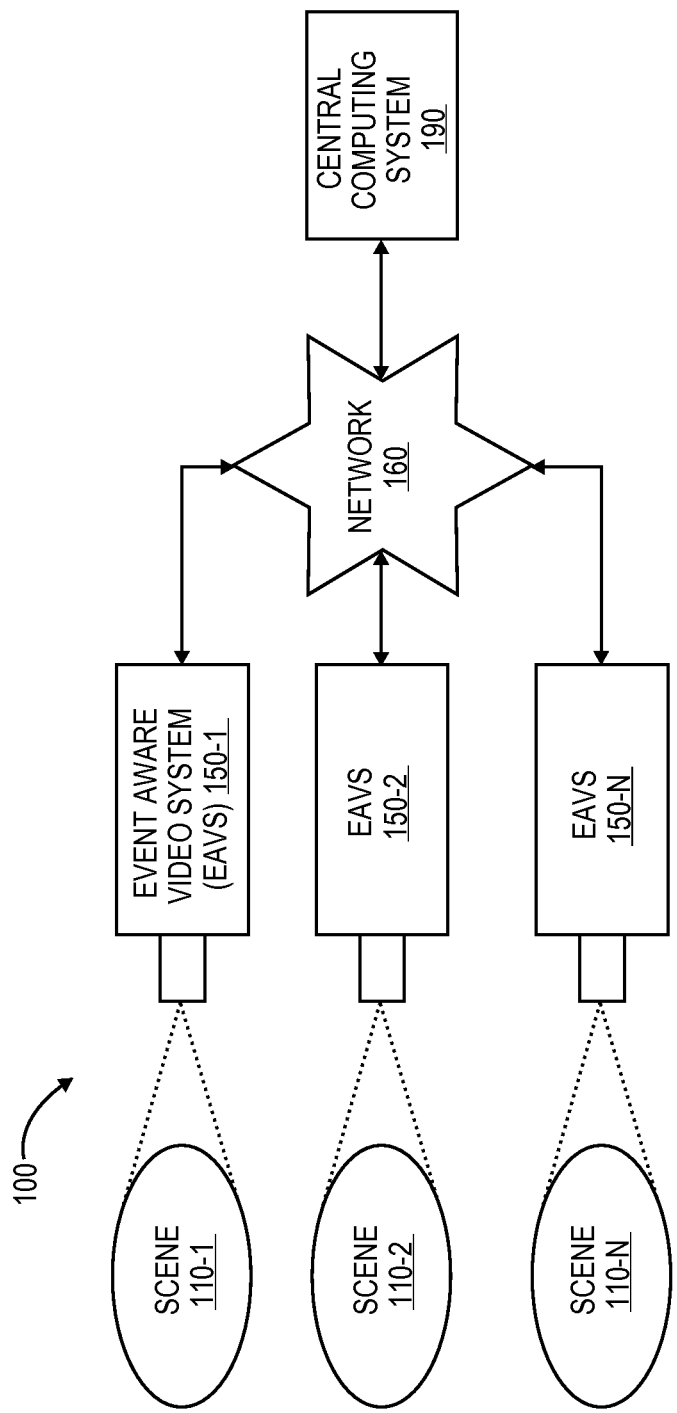
FIG. 1 illustrates a video surveillance system, including one or more event aware video system (EAVS) according to one embodiment.

A video surveillance system 100, which may support capturing event information in accordance with one embodiment, is illustrated in FIG. 1. In one embodiment, the video surveillance system 100 may comprise event aware video system (EAVS) 150-1 to 150-N, a network 160, and a central computing system 190. In one embodiment, the EAVS 150-1 to 150-N may capture images in the scene 110-1 to 110-N respectively.

The central computing system 190 may receive event information sent by the EAVS 150 and may perform further analysis. In one embodiment, the event information may comprise processed data generated by processing the event of a event frame. In one embodiment, the central computing system may conserve resources such as the processing cycles to further process the processed data. In one embodiment, the central computing system 190 may be used by a security officer, who may receive event information from EAVS 150-1 to 150-N and monitor a large area comprising scenes 110-1 to 110-N. In one embodiment, the central computing system 190 may represent a server system with large storage capability to store the event information for viewing at a later point in time as well.

The network 160 may comprise routers, switches, gateways, and similar other such devices to transfer event information between the EAVS 150 and the central computing system 190. In one embodiment, the bandwidth of the network 160 may be conserved as the processed data representing the event information is transferred over the network 160. The network 160 may represent a local area network, wide area network, metropolitan area network, internet, or any other such networks. In one embodiment, the network 160 may be wire based, or wireless based or a combination of both the wired and wireless technologies. The network 160 may support protocols such as transport control protocol/internet protocol (TCP/IP), user datagram protocol/internet protocol (UDP/IP), and such other similar protocols.

In one embodiment, the EAVS 150 may establish a 'no-event frame', compare an incoming frame with the no-event frame, and determine whether the incoming frame is an event frame or a no-event frame. In one embodiment, the EAVS 150 may determine that the incoming frame is an 'event frame' if the difference between the 'no-event frame' and the incoming frame is greater than a threshold value. In one embodiment, the 'no-event frame' may be used as a reference frame with which comparison is performed to detect the occurrence of an event.

In one embodiment, to establish the no-event frame, the EAVS 150 may capture video frames (P1, P2, ... Pt) at regular intervals over a time period 'K' before marking a video frame as a 'no-event frame'. In one embodiment, the EAVS 150 may compare each adjacent pair of frames over the time period 'K' to determine whether a video frame is a 'no-event frame'. For example, the EAVS 150 may compare first pair of adjacent frames (P2 and P1) and if the difference between the first pair of adjacent frames is less than the threshold value, the EAVS 150 may further compare second pair of adjacent frames (P3 and P2). Like-wise, the EAVS 150 may compare adjacent frames {(P4 and P3) . . . (Pt and Pt−1)} until the time period K is elapsed. If the difference between the adjacent pair of video frames is less than the threshold value, then the EAVS 150 may mark the most recent frame (Pt) as the no-event frame.

For example, if scene 110-1 represents an empty parking lot of shopping mall, the EAVS 150 may capture ten images P1 to P10 at time points T1 to T10 and compare the adjacent frames {(P2, P1), (P3, P2) . . . (P10, P9)} and if there is no activity detected, the image P10 may be marked as the 'no-event frame'. Further, the EAVS 150 may capture an image P11 at time point T11, compare the image P11 with the image P10 and if the difference between P10 and P11 is less than the threshold value, the image P11 may be discarded, while maintaining P10 as the no-event frame. In one embodiment, the EAVS 150 may mark the empty parking lot as a first no-event frame and store the first no-event frame in the no-event frame buffer 260.

However, if an event such as a car entering the parking lot is detected in the image P11, the EAVS 150 may capture the event, mark the image as an 'event frame', and transmit the event to the central computer system 190. In one embodiment, the EAVS 150 may compare P11 and P10 and the difference may be greater than the threshold value as an event (car entering the parking lot) has occurred. In one embodiment, the EAVS 150 may capture next ten images P12 to P21 and compare the adjacent pair of frames for detecting an event. If no event is detected, the frame P21 comprising a car parked in the parking lot may be marked as the 'no-event frame'. It may be noted that, the first 'no-event frame' was an empty parking lot and the second no event frame is a parking lot with a car parked in the parking lot. In one embodiment, the EAVS 150 may replace the first 'no-event frame' with the 'second no-event frame' in the no-event frame buffer 260. In one embodiment, the EAVS 150 may send the no-event frame at a first frame rate and at a first spatial quality to the central computing system 190.

In one embodiment, the event aware video system EAVS 150 may capture a present video frame (p+1$^{th}$ video frame) and mark the present video frame as an 'event frame' if the difference between the (p+1$^{th}$ video frame) and (P$^{th}$ video frame) is higher than the threshold value and if the (p+1$^{th}$ video frame) differs from the 'no-event' frame substantially. In one embodiment, the threshold value may be determined based on statistical or empirical methods. In one embodiment, the color value histogram (i.e. empirical probability distribution) at each pixel location is continuously collected from the no-event frame. If the color value at the same pixel location for the present video frame (P+1 video frame) falls outside a likelihood value of 90% of the no-event frame color distribution, that pixel may be marked as a candidate pixel for an event frame. In one embodiment, the likelihood value may be tunable system configuration parameter. Also, if there exists at least one large area of candidate pixels for the event frame in the present video frame (P+1th video frame), the entire frame may be marked as an event frame.

Also, in one embodiment, the entire frame may be divided into many small areas A1, A2 . . . Ak. The threshold value may be imposed on the change in average color level of X number of pixels in each area A1 of the present video frame compared to the same X pixels in the area A1 of the previous video frame. In one embodiment, if the average color level of X pixels in the area A1 changes by, for example, ten levels on the color scale (e.g., 0-255 color levels) then the EAVS 150 may mark the area A1 as a candidate of the event frame. In one embodiment, if candidate small areas A1, A2 . . . AJ connect together to form a larger area, then the present video frame (P+1 video frame) may be marked as the event frame. In one embodiment, the present video frame may be referred to as the 'event frame' and the previous video (Pth video frame) frame may be referred to as the 'no-event frame'.

In one embodiment, the event aware video system (EAVS) 150 may capture the event frame, extract event information from the event frame, analyze the event information, and transfer the event information to the central computing system 190. In one embodiment, the first event information sent to the central computing system 190 may comprise the difference between the no-event frame (P$^{th}$ frame) and a first event frame (P+1$^{th}$ frame). Also, the next event information may comprise the difference between the first event frame (p+1$^{th}$ frame) and the next event frame (P_next frame). In one embodiment, the EAVS 150 may send the event information at a second frame rate (SFR) and at a second spatial quality level (SQ). In one embodiment, the second frame rate may be higher than the first frame rate and the second spatial quality may be lower than the first spatial quality.

Figure 2:
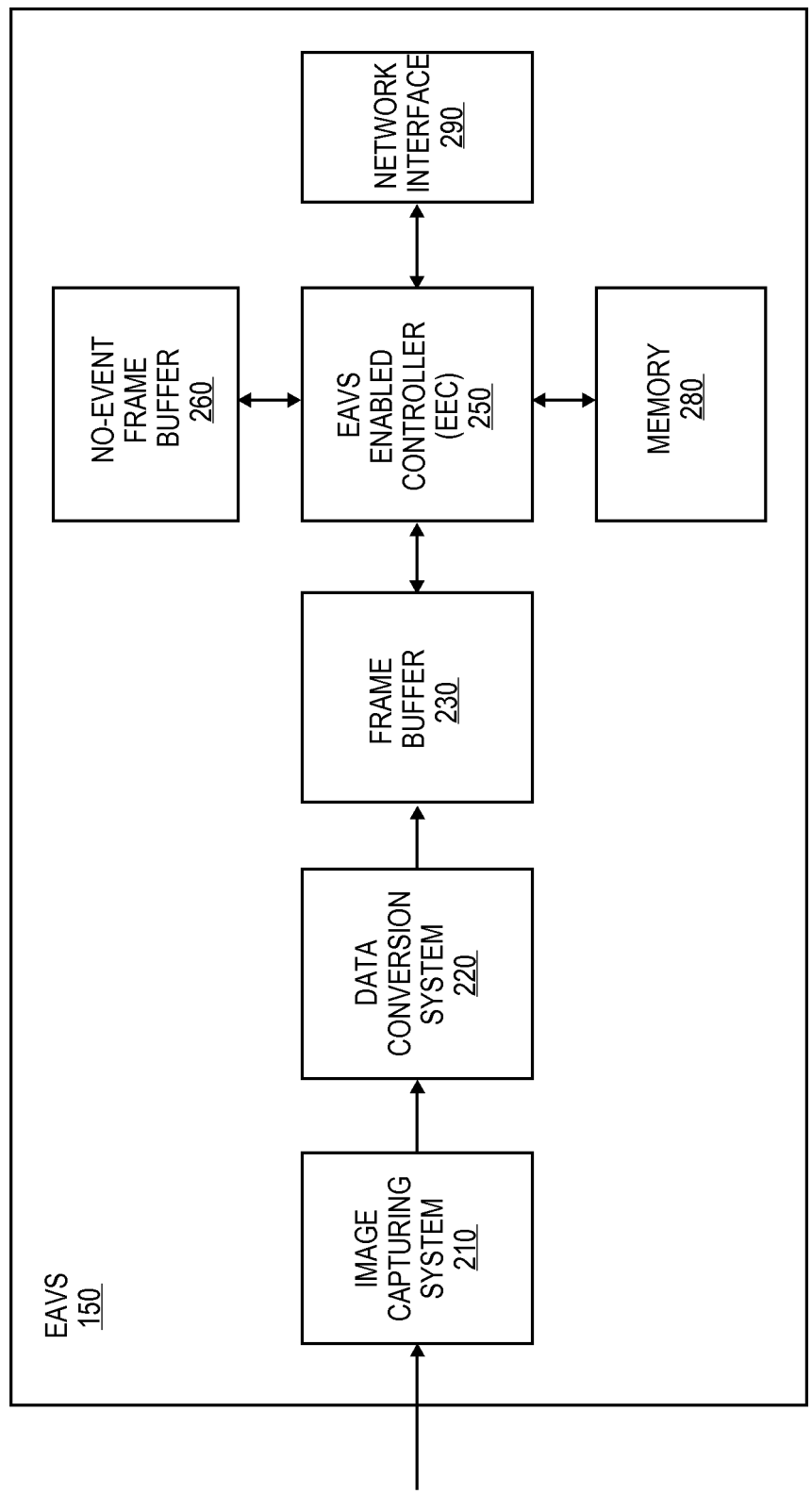
FIG. 2 illustrates the event aware video system (EAVS) in which event capturing technique is supported according to one embodiment.

An event aware video system (EAVS) 150, which may support capturing event information in accordance with one embodiment, is illustrated in FIG. 2. The EAVS 150 may comprise an image capturing system 210, a data conversion system 220, a frame buffer 230, EAVS enabled controller EEC 250, a no-event frame buffer 260, a memory 280, and a network interface 290.

The image capturing system 210 may capture the image and may comprise image capturing devices such as charge coupled devices (CCDs), CMOS sensors such as active pixel sensors, and similar such other devices. The image capturing system 210 may capture the optical signal and convert the optical signal into an electric signal. The data conversion system 220 may comprise analog-to-digital converters and other signal conditioning devices such as amplifiers, attenuators, noise cancellation devices and such other similar devices. The data conversion system 220 may receive the electrical signal from the image capturing system 210, condition the electric signal, and provide the conditioned signal to the frame buffer 230.

In one embodiment, the frame buffer 230 may store data representing the conditioned electric signal. In one embodiment, the frame buffer 230 may store a small number of frames (e.g., 2 to 3 frames) received from the data conversion system 230 that may be quickly retrieved by the EEC 250.

The no-event frame buffer 260 may be used to store the 'no-event frame'. At any give time point, there may exist one no-event frame, which may be stored in the no-event frame buffer 260. In one embodiment, the no-event frame buffer 260 may comprise a small amount of high speed memory. However, the no-event frame buffer 260 may be updated at regular intervals of time and thus may be provided with a capability of supporting higher refresh rates.

The memory 280 may store instructions that may be used by the EAVS enabled controller EEC 250 to capture event information. The memory 280 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in a system such as the video surveillance system 100.

The network interface 290 may receive data packets from the EAVS enabled controller 250 and may transfer the data packets over the network interface 290. In one embodiment, the network interface 290 may comprise a network interface card (NIC) to transfer the data packets to an appropriate routing device of the network 150.

The EAVS enabled controller (EEC) 250 may capture event information and transfer the event information to the central computing system 190. In one embodiment, the EEC 250 may retrieve a video frame from the frame buffer 230 and determine whether the video frame is a 'no-event frame' or an 'event frame'. In one embodiment, the EEC 250 may extract the event information from the video frame if the video frame is an event frame. In one embodiment, the EEC 250 may mark the video frame as 'no-event frame' and may store the 'no-event frame' in the no-event frame buffer 260 if the video frame is a 'no-event frame'.

Figure 3:
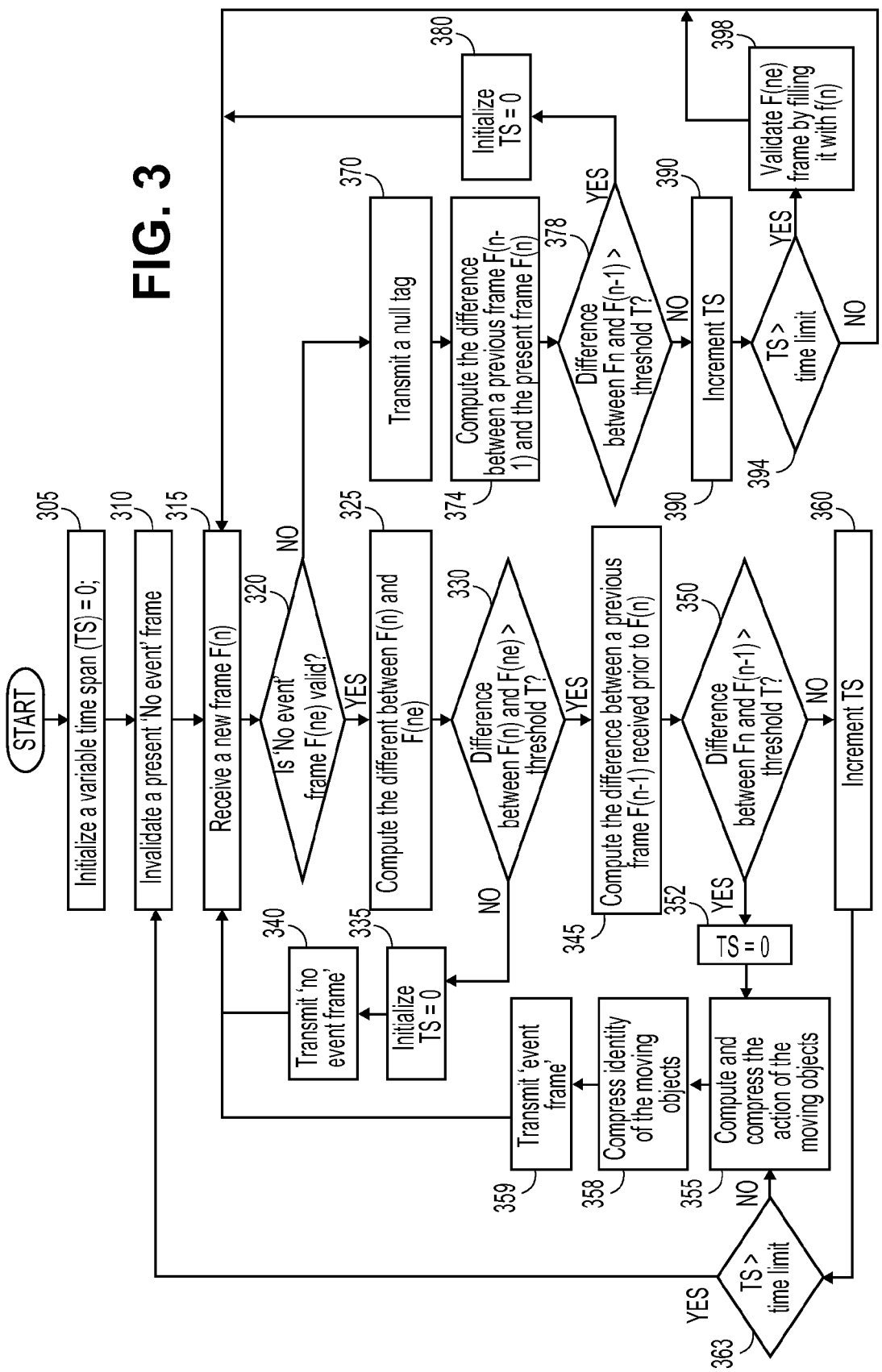
FIG. 3 is a flow diagram illustrating operations that may be performed by the EAVS according to one embodiment.

An operation of the EAVS enabled controller (EEC) 250 of the event aware video system (EAVS) 150 capturing the event information in accordance with one embodiment is illustrated in FIG. 3.

In block 305, the EEC 250 may initialize a variable time span TS to zero. In one embodiment, the time span TS may represent a time window during which all the input frames are different from the no-event frame while there is no occurrence of an event in the input frames. In one embodiment, a large TS value may imply that the current 'no-event' frame may not be valid anymore and a new 'no-event' frame may need to be re-established.

In block 310, the EEC 250 may invalidate the present 'no-event frame'. In one embodiment, the present 'no-event frame' is invalidated to set-up a new 'no-event frame', which may provide an accurate reference that may represent the scenario at scene 110-1 before capturing any event.

Figure 5:
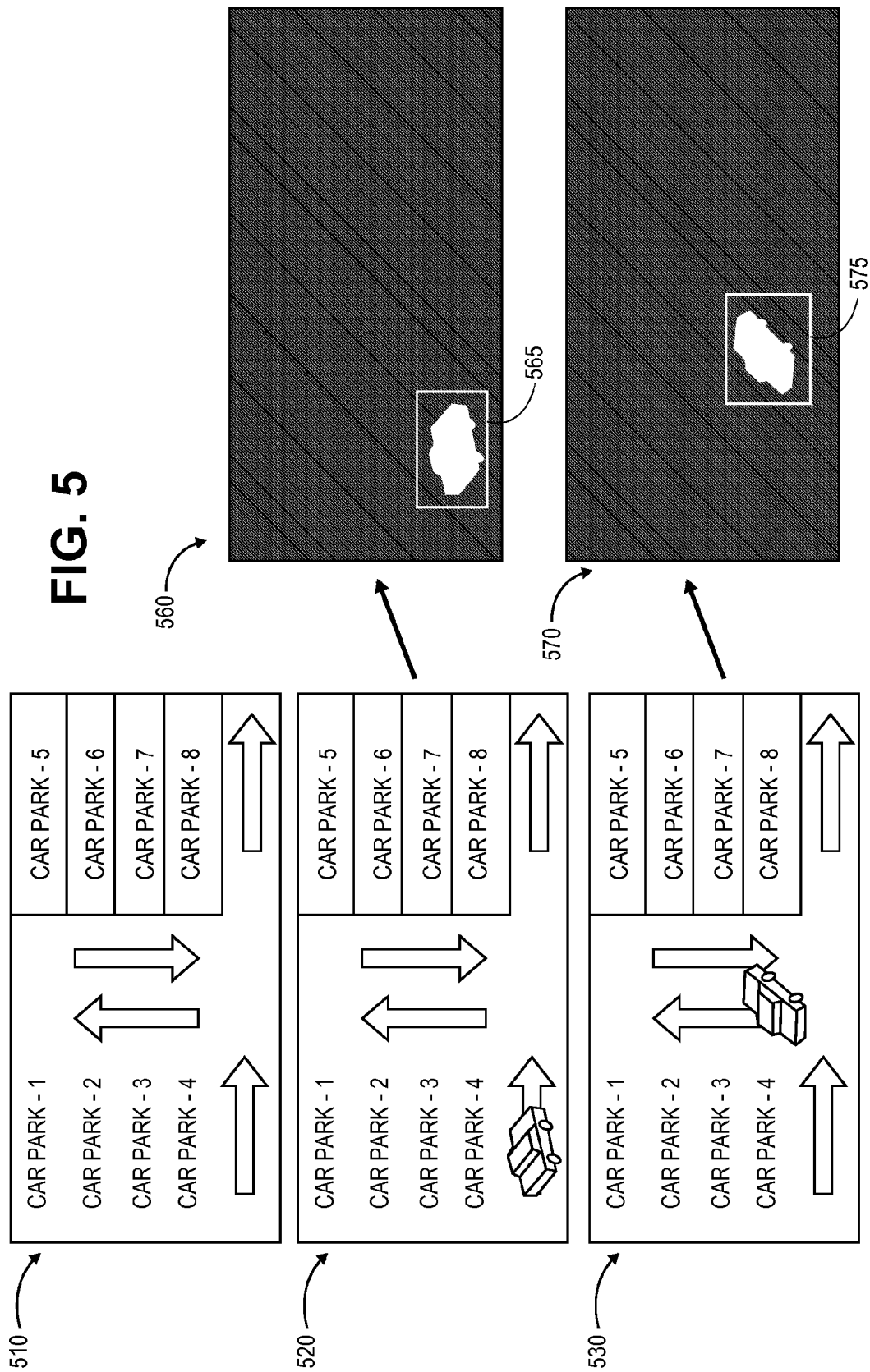
FIG. 5 illustrates one or more scenarios captured by the EAVS according to one embodiment.

For example, the present 'no-event frame', which is invalidated in block 305 may represent a parking lot with sunshine. However, a cloud may move over the parking lot after sometime and before the event is captured, a new 'no-event frame' may be established with a cloud over the parking lot. In one embodiment, the EEC 250 may invalidate the present 'no-event frame' (parking lot with sun shine) and re-establish a new 'no-event frame' (parking lot with clouds) to avoid false alarms. In one embodiment, the frame 510 (F(ne)) of FIG. 5 may represent a re-established 'no-event' frame, which may represent a cloud covered parking lot.

In block 315, the EEC 250 may retrieve a new frame F(n) from the frame buffer 230. In one embodiment, the EEC 250 may retrieve a frame 520 (=F(n)) of FIG. 5 that may be captured and stored in the frame buffer 230. In block 320, the EEC 250 may check whether a valid 'no-event' F(ne) is established and control passes to block 325 if the 'no-event' frame is valid and to block 370 otherwise.

In block 325, the EEC 250 may compute the difference between F(n) (frame 520) and F(ne) (frame 510) and control may pass to block 330. In block 330, the EEC 250 may check whether the difference between F(n) (frame 520) and F(ne) (frame 510) is greater than the threshold value and control passes to block 335 if the difference between F(n) (frame 520) and F(ne) (frame 510) is lesser than the threshold value and to block 345 if the difference between F(n) and F(ne) is greater than the threshold value.

In block 335, the EEC 250 may initialize the time span to zero. In block 340, the EEC 250 may mark the frame F(n) as the 'no-event' frame and transmit the 'no-event frame' to the central computer system 190. Control passes to block 315. In one embodiment, the difference between frame 520 and 510 may be lesser than the threshold value if the car has not entered the parking lot. Thus, the frame 520 may be marked as 'no-event' frame.

In block 345, the EEC 250 may compute the difference between a frame F(n−1) received prior to the new frame F(n). In block 350, the EEC 250 may check whether the difference between F(n) and F(n−1) is greater than the threshold value and control passes to block 355 if the difference between F(n) and F(n−1) is greater than a threshold value and to block 360 otherwise. In block 352, the EEC 250 may initialize the time span to zero.

In block 355, the EEC 250 may compute and compress the action of the moving objects. In block 358, the EEC 250 may compress the identity of the moving objects. In block 359, the EEC 250 may transmit the 'event frame' (frame 520) to the central computer system 190.

In block 360, the EEC 250 may increment the time span (TS) and control passes to block 363. In block 363, the EEC 250 may check whether the value of TS is greater than the time duration 'K" and control passes to block 310 if the value of TS is greater than the time duration K and to block 355 otherwise.

In block 370, the EEC 250 may transmit a null tag. In one embodiment, the null tag may indicate that the 'no-event frame' is yet to be established. In block 374, the EEC 250 may compute the difference between the frame F(n−1) received prior to the new frame F(n).

In block 378, the EEC 250 may check whether the difference between F(n) and F(n−1) is greater than the threshold value and control passes to block 380 if the difference between F(n) and F(n−1) is greater than the threshold value and to block 390 otherwise.

In block 380, the EEC 250 may initialize the time span to zero and control passes to block 315. In block 390, the EEC 250 may increment the time span (TS) and control passes to block 394.

In block 394, the EEC 250 may check whether the value of TS is greater than the time duration 'K' and control passes to block 398 if the value of TS is greater than the time duration K and to block 315 otherwise. In block 398, the EEC 250 may validate F(ne) frame by replacing the 'no-event frame' F(ne) with the new frame F(n).

Figure 4:
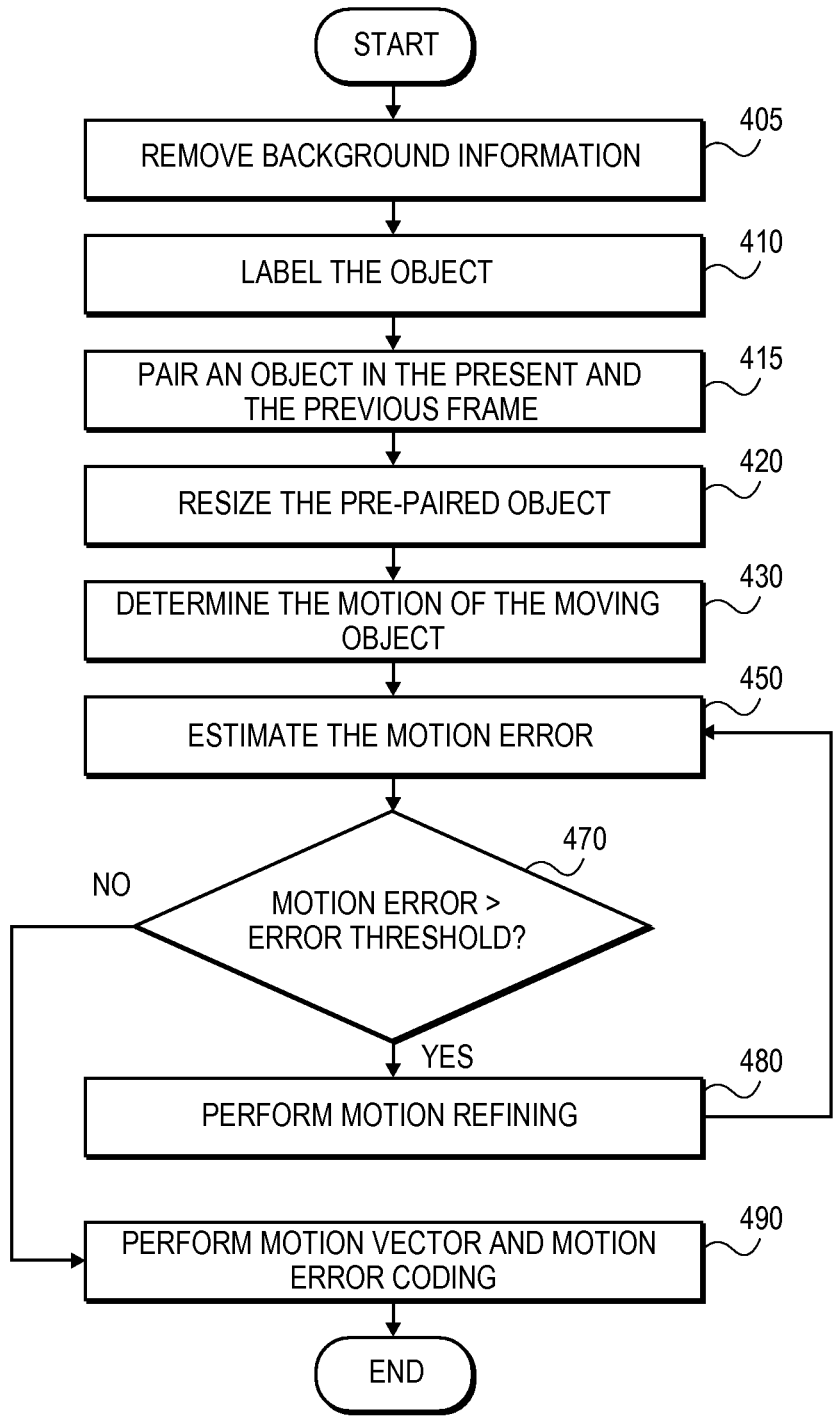
FIG. 4 is a flow diagram illustrating compute and compress operation performed by the EAVS according to one embodiment.

An operation of the EAVS enabled controller (EEC) 250 of the event aware video system (EAVS) 150 computing and compressing the event information in the event frame in accordance with one embodiment is illustrated in FIG. 4.

In block 405, the EEC 250 may remove the background information from the 'event frame' (frame 520). In one embodiment, the EEC 250 may generate the frame 560 after removing the background information from the frame 520. In one embodiment, the EEC 250 may comprise a finite impulse response (FIR) filter, which may compare every pixel of the new frame F(n) against a corresponding pixel in the 'no-event frame' F(ne). After comparison, the EEC 250 may identify pixels in which the difference of color levels in F(ne) and F(n) is lesser than the threshold value. In one embodiment, the EEC 250 may mark all the pixels with difference lesser than the threshold value as a portion of the background.

In one embodiment, the color levels for red (R), green (G), and blue (B) of the pixels identified as a portion of the background may be set to represent black color. In one embodiment, setting the color levels of the pixels to black may be equivalent to removing the background information. In one embodiment, the new frame F(n) in which the background information may be removed may be referred to as a background removed frame BRF(n). In one embodiment, the FIR filter may comprise a multiplier, an accumulator, memory rows, and DMA logic to perform filtering and removal of background information. In one embodiment, the EEC 250 may generate a 1-bit bit-map b(n), which may indicate the position of the moving objects in the background removed present frame BRF(n). In one embodiment, the bit-map b(n) may indicate whether each pixel of the frame BRF(n) is a portion of the moving object or the background. For example, the pixels 3-8 of row-1 and pixels 1 to 14 of row-2 may represent a portion of the moving object and the bit-map b(n) may comprise a first logic value (e.g., 1) for these pixels (3 to 8 of row-1 and 1 to 14 of row-2) and for the remaining pixels, the bit-map b(n) may comprise a second logic value (e.g., 0).

However, to identify an event, the frames 520 and 530 are captured at higher rate. For example, the new frame 520 captured at time point T1 may become a previous frame after a next frame 530 is captured at time point T2, wherein T1 occurs prior to T2. In one embodiment, the frame F(n) (frame 530) may represent a new frame captured at the most recent time point T2, BRF(n) (frame 570) may represent the frame F(n) (frame 530) from which the background information is removed, and b(n) may represent the bit-map of the BRF(n) (frame 570). In one embodiment, the frame 520 captured immediately prior to F(n) may be referred to as a previous frame F(n−1) and BRF(n−1) (frame 560) may represent the previous frame F(n−1) (frame 520) from which the background information is removed, and b(n−1) may represent the bit-map of the BRF(n−1). In one embodiment, a bit-map b(n−1) may indicate the position of the moving objects in the frame BRF(n−1).

In block 410, the EEC 250 may label the moving objects that represent an event. In one embodiment, the event frame may comprise one or more moving objects and the EEC 250 may label each of the moving objects with an identifier (moving object ID). In one embodiment, the EEC 250 may scan the bit-map b(n) and the frame BRF(n) before labeling the moving objects and may label the moving objects using a variable 'i', wherein 'i' may be a positive integer value (e.g., i=1, 2, 3 . . . L) identifying each of the moving objects, where L is the total number of the moving objects in the frame. For each pixel in the BRF(n) may be logically labeled as either belonging to one of the moving objects or the background. Also, for each moving object, the EEC 250 may collect a statistics vector V(i, k), wherein 'i' may represent the moving object ID and 'k' may represent index of the frame. In one embodiment, the statistics vector may include size and location of a bounding rectangle in the BRF(n), total mass of Y, U, and V components of the moving object, location of the gravity center of Y component of each of the moving objects, and such other similar statistics, which may allow accurate identification of the moving objects.

In block 415, the EEC 250 may pair the moving objects in the new frame BRF(n) (frame 570) and the previous frame BRF(n−1) (frame 560). In one embodiment, the EEC 250 may pair the moving objects using the statistics vector V(i, k) and V(i', k−1) determined in block 410. In one embodiment, the EEC 250 may detect the pairs corresponding to the moving objects in BRF(n) and BRF(n−1). In one embodiment, the EEC 250 may determine a corresponding moving object in BRF(n−1) for each moving object in BRF(n) such that both the moving objects represent the same portion of the event frame. In one embodiment, the EEC 250 may perform pairing based on statistics V(i, k) of BRF(n) and V(i', k−1) of BRF (n−1) using the following principles: Suppose O(i, k) and O(i', k−1) are the two objects corresponding to V(i, k) and V(i', k−1), then, a. If the total masses of V(i, k) scaled to the bounding rectangle's area of V(i, k) are similar to the same quantity of V(i', k−1), then O(i, k) and O(i', k−1) are more likely to be the same object;

b. If the location of gravity center of V(i, k) relative to the center of the bounding rectangle of V(i, k) is similar to the same quantity of V(i', k−1), then O(i, k) and O(i', k−1) are more likely to be the same object; For example, if the location of gravity of center of V(i, k) is Lgi and that of V(i', k−1) is Lgi' and if the center of the bounding rectangle of V(i, k) is Lbi and that of V(i', k−1) is Lbi', then if $\{(Lgi-Lbi)-(Lgi'-Lbi')\}$ is zero or very small then O(i, k) and O(i', k−1) are more likely to be the same object; and c. There may exist utmost one O(i', k−1) to match O(i, k).

In one embodiment, as a result of the object pairing, EEC 250 may determine the object-level motion vector, which indicates the spatial shift between the location of gravity center of O(i', k−1) and the location of gravity center of O(i, k).

In block 420, the EEC 250 may resize the pre-paired moving objects. In one embodiment, for each paired object in BRF(n) and BRF(n−1), the EEC 250 may resize the bounding rectangle in BRF(n) such that the bounding rectangle in BRF (n) may have a size same as that of the bounding rectangle in BRF(n−1). In other embodiment, for each paired object in BRF(n) and BRF(n−1), the EEC 250 may resize the bounding rectangle in BRF(n−1) such that the bounding rectangle in BRF(n−1) may have a size same as that of the bounding rectangle in BRF(n). In one embodiment, the EEC 250 may choose the size of the bounding rectangle to be less than $\frac{1}{5}^{th}$ of the total image size. In one embodiment, the EEC 250 may perform interpolation on the Y-component of the pixels present in the resized moving objects. In one embodiment, the Y-component interpolation in BRF(n) may result in Y(i, k), which may cover O(i, k). In one embodiment, the Y-component interpolation in BRF(n−1) may result in Y(i', k−1), which may cover O(i', k−1).

In one embodiment, the resizing the pre-paired moving objects may improve accuracy of the motion vector estimate and reduce the motion error. In one embodiment, the resizing of the per-paired moving objects may be performed to maintain the size of the moving objects. In one embodiment, maintaining the size of the moving objects may improve the accuracy as it is easier to estimate the motion vector for a moving object if the size of the moving object does not change the size in the view as compared to estimating the motion vector for the moving object changing its size in the view. In one embodiment, the removal of background may allow per-paired resizing of the moving objects. In one embodiment, the resizing may be performed using linear interpolation of pixels.

For example, the bounding rectangle size for the frame BRF(n−1) may equal Q (=3×3 pixel matrix) and that of BRF (n) may equal Z (=2×2) pixel matrix. In one embodiment, the size Q may be made equal to Z. In one embodiment, Q may equal a 3×3 pixel matrix and may comprise elements {(1, 2, 3), (4, 5, 6), and (7, 8, 9)]. In one embodiment, the 3×3 pixel matrix may be resized into a 2×2 pixel matrix comprising elements {(3, 4), (6, 7)}. In one embodiment, the first element (=3) may be generated by summing the first four elements (1+2+4+5=12) of the top left 2×2 matrix comprising elements (1, 2, 4, 5) and dividing the sum by the number of elements (=4) in the top left matrix. The resulting resized 2×2 matrix may comprise elements {(3, 4), (6, 7)}.

In block 430, the EEC 250 may determine a real motion vector (V) of the moving object. In one embodiment, EEC 250 may determine the real motion vector by computing the center of gravity of the bounding rectangles B(k) and B(k−1) and the difference between the center of gravity of B(k) and B(k−1) may represent the real motion vector. In one embodiment, the location of the gravity centers of V(i, k) and V(i', k−1) may provide the motion vector of the moving objects. In one embodiment, in the previous frame, the bounding box B(k−1) for an object may be centered at coordinate (X,Y)=(7, 13) and the pixels inside B(k−1) may equal {(1, 2), (3, 4)}. In one embodiment, in the current frame, the bounding box B(k) for the same object may be centered at coordinate (X,Y)=(25, 49) and the pixels inside the B(k−1) may equal {(9, 7), (10, 8)}. In one embodiment, the coordinate of the gravity center of B(k−1) may equal (X,Y)=(7.1, 12.8) and the gravity center of B(k) may equal (X,Y)=(24.94, 48.97). In one embodiment, by the definition of gravity center may be computed for B(k−1) and B(k) as follows:

For B(k−1), X-coordinate=(7−0.5)*(1+3)/(1+2+3+4)+(7+0.5)*(2+4)/(1+2+3+4)=7.1; and Y-coordinate=(13−0.5)*(3+4)/(1+2+3+4)+(13+0.5)*(1+2)/(1+2+3+4)=12.8.

For B(k), X-coordinate=(25−0.5)*(9+10)/(7+8+9+10)+(25+0.5)*(7+8)/(7+8+9+10)=24.94; and Y-coordinate=(49−0.5)*(10+8)/(7+8+9+10)+(49+0.5)*(9+7)/(7+8+9+10)=48.

In one embodiment, the real motion vector derived from the gravity centers from B(k−1) to B(k) is then: (24.94−7.1, 48.97−12.8)=(17.84, 36.17).

In block 450, the EEC 250 may estimate the motion error. In one embodiment, the EEC 250 may shift the moving object in B(k−1) by the real motion vector to generate an estimated moving object in B(k). In one embodiment, the EEC 250 may determine the motion error by computing the difference between the real and the estimated motion vector. In one embodiment, the EEC 250 may estimate the motion error by computing the difference between Y(i, k) and the motion estimate of Y(i, k) based on the motion vectors Y(i, k) and Y(i', k−1). In one embodiment, the motion vector from B(k−1) to B(k) may be used to shift the moving object in B(k−1) by an amount V to become motion estimated B(k), called B'(k). In one embodiment, the estimated motion vector from B(k−1) to B(k) may be determined by shifting the moving object in B(k−1) by an amount V to get motion estimated B(k), called B'(k), the error 'e' may be computed using e=[B(k)−B'(k)].

In block 470, the EEC 250 may determine if the motion error is greater than the allowable error threshold and control passes to block 480 if the motion error is greater than the allowable error threshold and to block 490 if the motion error is lesser than the allowable error threshold. In one embodiment, the EEC 250 may compare the error 'e' with an allowable error threshold and if the error 'e' is greater than the allowable error threshold value, then the refined motion estimate for the bounding box B(k) may be performed by dividing the bounding box B(k) into 'X' smaller rectangles, for example, Bsmall(k, m), m=1, 2, 3, 4.

In block 480, the EEC 250 may perform motion refining and control passes to block 450. In one embodiment, for each smaller rectangle Bsmall(k, m), a traditional motion search may be performed by moving Bsmall(k, m) around within B(k−1) to find the best match between Bsmall(k, m) and a rectangle of the same size in B(k−1). In one embodiment, such an approach may generate four motion vectors V(m), m=1, 2, 3, 4, for each of the smaller rectangles. In one embodiment, the motion error for each of the smaller rectangles may be determined as described above. If the error is small enough, the refining of the motion error for that particular small rectangle may be considered as completed. However, if the error is larger, the smaller rectangle may be further divided into the smaller rectangles into, for example, X smaller rectangles and the motion estimation may be performed again for the smaller rectangles. In one embodiment, the process may be continued until motion errors are all within the limit. Such as process may be referred to as "Motion refining".

In block 490, the EEC 250 may perform motion vector and motion error coding. In one embodiment, the EEC 250 may perform encoding using, for example, discrete cosine transform (DCT) on the motion errors of YUV, quantization of the DCT coefficients, compression of motion errors, and such other similar operations. In one embodiment, the event information such as the bounding rectangles of all the moving objects, object level motion vectors of the all the moving objects, object pairing and resizing factors, encoded and compressed values of motion errors may be sent over the network to the central computer system 190.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method in a video capturing device, comprising:
capturing a first plurality of video frames during a first time period;
establishing a present no-event frame from the first plurality of video frames, wherein a last frame of the first plurality of video frames is marked as the present no-event frame if the difference between adjacent pair of frames of the first plurality of video frames is less than a threshold value;
establishing an event frame, wherein a present frame captured after establishing the no-event frame is marked as the event frame if the difference between the present frame and a previous frame captured prior to the present frame is greater than the threshold value; and
providing event information to a central computing system, wherein the event information is generated by processing the event extracted from the event frame;
wherein processing the event comprises generating a real motion vector of a moving object in the event frame; and
wherein generating the real motion vector of the moving object comprises:
labeling the moving object;
pairing the moving object in the event frame with a moving object in the previous frame;
resizing a boundary of the moving object in the event frame to match a boundary of the moving object in the previous frame; and
computing the co-ordinates of the center of gravity of the boundary of the moving object in the event frame and the previous frame.

2. The method of claim 1 further comprises rejecting the present frame captured after the first time period if the difference between the present frame and the no-event frame is less than the threshold value.

3. The method of claim 1, wherein processing the event comprises removing background information of the event frame before sending the event information to the central computing system.

4. The method of claim 3, wherein removing the background comprises:

identifying an area that excludes the event in the event frame; and assigning a first color value to the pixels of the area, wherein assigning the first color to the pixels of the area removes the background information in the event frame.

5. The method of claim 1 further comprises computing motion error of the moving object.

6. The method of claim 5, wherein computing the motion error comprises:
   generating an estimated motion vector by displacing the moving object in the previous frame using the motion vector; and
   computing the difference between the real moving object image and the motion estimated moving object image.

7. The method of claim 5 further comprises:
   performing motion refining if the motion error is greater than an allowable error threshold; and
   performing motion error coding if the motion error is lesser than the allowable error threshold.

8. The method of claim 7 performing the motion refining further comprises:
   sub-dividing the boundary of the moving object in the event frame into first, second, third, and fourth smaller rectangles; and
   determining a first, second, third, and a fourth motion vector and error for the first, second, third, and fourth smaller rectangles.

9. The method of claim 7 performing the motion error coding further comprises:
   generating transformation values by performing a discrete cosine transform on the motion error; and
   performing compression of the motion error.

10. An apparatus, comprising:
    an image capturing unit to capture a first plurality of video frames during a first time period;
    an event aware video system enabled controller coupled to the image capturing unit, wherein the event aware video system enabled controller is to:
      establish a present no-event frame from the first plurality of video frames, wherein a last frame of the first plurality of video frames is marked as the present no-event frame if the difference between adjacent pair of frames of the first plurality of video frames is less than a threshold value; and
      establish an event frame, wherein a present frame captured after establishing the no-event frame is marked as the event frame if the difference between the present frame and a previous frame captured prior to the present frame is greater than the threshold value; and
    a network interface coupled to the event aware video system enabled controller, wherein the network interface is to transfer the event information to a central computing system, wherein the event information is generated by processing the event extracted from the event frame;
    wherein the event aware video system enabled controller is to generate a real motion vector of a moving object in the event frame; and
    wherein the event aware video system enabled controller is to:
      label the moving object;
      pair the moving object in the event frame with a moving object in the previous frame;
      resize boundary of the moving object in the event frame to match the boundary of the moving object in the previous frame; and
      compute the co-ordinates of the center of gravity of the boundary of the moving object in the event frame and the previous frame.

11. The apparatus of claim 10 further comprises:
    a frame buffer coupled to the event aware video system enabled controller, wherein the frame buffer is to store the first plurality of images; and
    a no-event frame buffer coupled to the event aware video system enabled controller, wherein the no-event frame buffer is to store the no-event frame.

12. The apparatus of claim 10, wherein the event aware video system enabled controller is to remove background information of the event frame while processing the event frame.

13. The apparatus of claim 12, wherein the event aware video system enabled controller is to:
    identify an area that excludes the event in the event frame; and
    assign a first color value to the pixels of the area, wherein assigning the first color to the pixels of the area removes the background information in the event frame.

14. The apparatus of claim 10, wherein the event aware video system enabled controller is to compute motion error of the moving object.

15. The apparatus of claim 14, wherein the event aware video system enabled controller is to:
    generate an estimated motion vector by displacing the moving object in the previous frame using the motion vector; and
    compute the difference between the real moving object image and the motion estimated moving object image.

16. The apparatus of claim 14, wherein the event aware video system enabled controller is to:
    perform motion refining if the motion error is greater than an allowable error threshold; and
    perform motion error coding if the motion error is lesser than the allowable error threshold.

17. The apparatus of claim 16, wherein the event aware video system enabled controller is to:
    sub-divide the boundary of the moving object in the event frame into first, second, third, and fourth smaller rectangles; and
    determine a first, second, third, and a fourth motion vector and error for the first, second, third, and fourth smaller rectangles.

18. A system comprising:
    an event aware video system;
    wherein the event aware video system is to establish a present no-event frame from a first plurality of video frames comprising two or more adjacent pairs of frames, wherein a last frame of the first plurality of video frames is marked as the present no-event frame if the difference between each adjacent pair of frames of the first plurality of video frames is less than a threshold value;
    wherein the event aware video system is to establish an event frame, wherein a present frame captured after establishing the present no-event frame is marked as the event frame if the difference between the present frame and a previous frame captured prior to the present frame is greater than the threshold value;
    a network to couple the event aware video system to a central computing system, wherein the network is to transfer the event information to a central computing system, wherein the event information is generated by processing the event extracted from the event frame; and
    to generate a real motion vector of a moving object in the event frame, the event aware video system is to:

label the moving object;
pair the moving object in the event frame with a moving object in the previous frame;
resize boundary of the moving object in the event frame to match the boundary of the moving object in the previous frame; and
compute the co-ordinates of the center of gravity of the boundary of the moving object in the event frame and the previous frame.

19. The system of claim 18, wherein the event aware video system is to:
detect the occurrence of events in a scene by marking the frame as the event frame; and
generate processed data by processing the event frame, wherein processed data is generated by removing background information from the event frame, determining the motion of the moving object in the event frame, determining a motion error, and coding the motion error.

20. The system of claim 18, wherein the central computing system is to receive the processed data and reproduce the event information, wherein reproducing the processed data is to conserve the processing cycles of the central computing system.

21. The system of claim 18, wherein the network is to transfer the processed data to the central computing system, wherein transferring the processed data conserves bandwidth of the network.

* * * * *